United States Patent [19]

Ata et al.

[11] Patent Number: 5,589,038
[45] Date of Patent: Dec. 31, 1996

[54] MAGNETIC SUBSTANCE

[75] Inventors: Masafumi Ata, Kanagawa; Masataka Machida, Tokyo; Haruo Watanabe, Kanagawa, all of Japan

[73] Assignee: Sony Corporation, Tokyo, Japan

[21] Appl. No.: 556,641

[22] Filed: Nov. 13, 1995

Related U.S. Application Data

[63] Continuation of Ser. No. 939,723, Sep. 2, 1992, abandoned.

[30] Foreign Application Priority Data

| Sep. 5, 1991 | [JP] | Japan | 3-254759 |
| Oct. 31, 1991 | [JP] | Japan | 3-286353 |
| Dec. 4, 1991 | [JP] | Japan | 3-320722 |

[51] Int. Cl.$^6$ ............................................. C04B 35/00
[52] U.S. Cl. .......................... 204/157.42; 423/445 B; 252/62.54; 252/502; 252/510; 252/511; 252/62.51 R
[58] Field of Search ............. 423/445 B, DIG. 40; 252/510, 511, 502, 62.54, 62.51; 204/157.42

[56] References Cited

U.S. PATENT DOCUMENTS

| 5,178,980 | 1/1993 | Mort et al. | 430/58 |
| 5,215,841 | 6/1993 | Scharfe et al. | 430/59 |
| 5,281,653 | 1/1994 | Thomann et al. | 524/490 |
| 5,292,813 | 3/1994 | Patil et al. | 525/240 |
| 5,294,732 | 3/1994 | Chiong et al. | 423/445 B |
| 5,302,681 | 4/1994 | McClain | 526/340.2 |
| 5,391,323 | 2/1995 | Haddon et al. | 423/445 B |

OTHER PUBLICATIONS

Haufler et al., *Journal of Physical Chemistry*, vol. 94, pp. 8634–8636, 1990.
Olah et al. *J. Am. Chem. Soc.*, 113(24), pp. 9385–9387, Dec. 20, 1991.
Selig et al. *J. Am. Chem. Soc.*, 113(14), pp. 5475–5476, Jul. 3, 1991.
Tebbe et al. *J. Am. Chem. Soc.*, 113(26) pp. 9900–9901 Dec. 18, 1991.

*Primary Examiner*—Michael Lewis
*Assistant Examiner*—Stuart L. Hendrickson
*Attorney, Agent, or Firm*—Hill, Steadman & Simpson

[57] ABSTRACT

A light yet highly workable magnetic substance is disclosed which consists mainly of a wholly novel material, fine crystal spherical carbon represented by $C_nX_m$ where n is an integer selected from the group consisting of 60, 70, 76, 84, etc., m represents a positive number not more than n and not zero, and X represents at least one of hydrogen, fluorine, chlorine, bromine and iodine.

4 Claims, 16 Drawing Sheets

1mT

MAGNETIC SUBSTANCE

This application is a continuation of application Ser. No. 07/939,723, filed Sep. 2, 1992, now abandoned.

DETAILED DESCRIPTION OF THE INVENTION

1. Field of the Invention

The present invention relates to a wholly novel magnetic substance derived from a spherical compound composed of a carbonaceous material name fullerene molecule which exhibits ferromagnetism though being an organic material.

2. Description of the Prior Art

Not only in the field of magnetic recording, but also as represented by their use as toner and magnetic fluids used as shielding materials in electrophotography, magnetic substances are widely used in every area of the field, and their use is expected to further increase in the future.

SUMMARY OF THE INVENTION

Incidentally, most of the magnetic substances conventionally used are oxidized materials (for example, ferrite, $\gamma$—$Fe_2O_3$ which is widely used as magnetic powder for magnetic recording media, etc.), or metallic materials (such as Fe, Co, Ni or an alloy thereof). Pointed out disadvantages thereof include high weight, extreme hardness and poor workability.

These disadvantages not only impede progress in each of the above mentioned fields, but also create severe limitations on the use of the magnetic substances themselves.

As a result, the development of a light yet highly workable magnetic substance has been much anticipated.

The present invention is presented in the light of the above circumstances of the prior art, with an object to provide a magnetic substance composed of a wholly novel material which is both light and highly workable, as well as a method for the production thereof.

DETAILED DESCRIPTION OF THE INVENTION

We, the inventors of the present invention, have made much diligent research over a long period of time in order to achieve the above mentioned object, and particularly have made various studies regarding the application of fullerene magnetic materials having a specific molecular structure and an electronic structure.

As a result, it has been found that when at least one of hydrogen, fluorine, chlorine, bromine and iodine is introduced into fine crystal spherical carbon, it functions as a magnetic substance.

The present invention has been completed based on this knowledge. That is, the magnetic substance according to the present invention is characterized by consisting mainly of fine crystal spherical carbon represented by $C_nX_m$ where n is an integer selected from the group consisting of 60, 70, 76, 84, etc., and m represents a positive number not more than n and not zero, and X represents at least one of hydrogen, fluorine, chlorine, bromine and iodine.

Fine crystal spherical carbon composed of 60, 70, 76 or 84 carbon molecules combined in a spherical cluster (molecular aggregate) is named fullerene, and each is indicated by $C_{60}$, $C_{70}$, $C_{76}$ and $C_{84}$, respectively.

Figure 1:
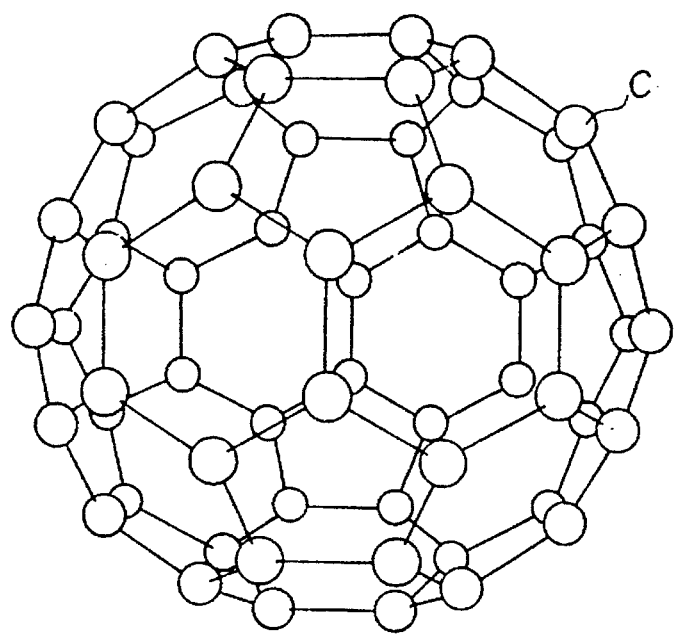
FIG. 1 is a model diagram of the molecular structure of fine crystal spherical carbon $C_{60}$.

For example, $C_{60}$ possesses a polyhedral structure called a "truncated icosahedron" formed by cutting off all of the vertices of a regular icosahedron to produce regular pentagons. As shown in FIG. 1, $C_{60}$ is a cluster where the 60 vertices of this polyhedron are all substituted with carbon atoms C, and the molecular structure is of an official soccer ball shape. Likewise, $C_{70}$, $C_{76}$, and $C_{84}$ possess molecular structures resembling the shape of a rugby ball.

The above mentioned fine crystal spherical carbon as it is exhibits no magnetism. In order to apply it as a magnetic material it is necessary to add a spin to the fine crystal spherical carbon to magnetize it.

Generally, in order to magnetize any compound an unpaired electron spin must be added thereto, a method for which might include adding or removing one electron to make a π-form anion or cation radical. There is a further method whereby either a halogen such as fluorine, bromine, chlorine, or iodine, or a hydrogen atom is introduced into the fine crystal spherical carbon. In this case, the hydrogen or halogen atom forms a covalent bond with said fine crystal spherical carbon, to produce a neutrally charged radical. In the case of a hydrogen atom, an ion pair is formed which consists of the hydrogen ion (proton) and the anion radical of said fine crystal spherical carbon; and in the case of a halogen element, an ion pair is formed which consists of the halogen anion and the cation radical of said fine crystal spherical carbon.

According to the present invention, as described above, hydrogen, fluorine, bromine, chlorine or iodine is introduced into said fine crystal spherical carbon in order to magnetize it.

Concretely, the methods described below may be used. That is, a method by which an organic polymer containing at least one of hydrogen or a halogen element such as fluorine, chlorine, bromine or iodine is dissolved in a solvent to produce a viscous solution, the above mentioned fine crystal spherical carbon is dispersed therein at an arbitrary proportion using ultrasonic irradiation or the like, and due to the catalytic effect of the carbon, at least one of a hydrogen and a halogen atom such as fluorine, chlorine, bromine or iodine is introduced into the carbon; a method by which the above mentioned fine crystal spherical carbon and either a halogen-containing salt such as an alkyl halide, or solid state hydrogen, or a simple halogen substance, are dispersed in an arbitrary solvent at arbitrary proportions using ultrasonic irradiation or the like; a method by which the above mentioned fine crystal spherical carbon and either a halogen-containing salt such as an alkyl halide, or solid hydrogen, or a simple substance halogen, are dispersed in an arbitrary solution of an organic polymer or a monomer at arbitrary proportions using ultrasonic irradiation or the like, after which the mixture is solidified by removal of the solvent through drying or polymerization; a method by which liquid or gaseous hydrogen atom or simple substance halogen is contacted with said fine crystal spherical carbon in an arbitrary solvent in order to introduce the hydrogen or halogen into the carbon; or a method by which liquid or gaseous hydrogen atom or simple substance halogen is contacted with said fine crystal spherical carbon in an arbitrary solution of an organic polymer or a monomer in order to introduce the hydrogen or halogen into the carbon, after which the mixture is solidified by removal of the solvent through drying or polymerization. The fine crystal spherical carbon into which hydrogen or a halogen was introduced by the above methods need only be sealed and placed in a dark place. Of course, as the need arises heat, irradiation, etc. may be applied.

By these simple procedures, hydrogen or a halogen is introduced into the fine crystal spherical carbon utilizing the catalytic effect possessed by the carbon itself, and the resulting fine crystal spherical carbon is a paramagnetic substance.

An inventive aspect of the present invention results from our new discovery that in order to obtain ferromagnetism using said paramagnetic fine crystal spherical carbon, it is not enough to simply collect and solidify said fine crystal spherical carbon, and said fine crystal spherical carbon must be dispersed and solidified within the matrix of a non-conductive material. That is, the present invention may be accomplished by dispersing said fine crystal spherical carbon in an organic polymer or non-conductive liquid. Here, "dispersion" means dispersion of said carbon particles in order one by one, and dispersion wherein the dispersed units are the aggregate of said particles (fine crystal spherical carbon particles are reported to aggregate by forming molecular crystals of hcp or fcc packed as closely as possible). Here, when the above mentioned aggregate forms the above mentioned radical ion pair, a counter ion may exist in the spaces within the aggregate, and in some cases the stoichiometry may not be maintained in a minute area. A method for carrying out the present invention may be a method as described above which uses an organic polymer capable of hydrogenation or halogenation, and utilizes this organic polymer as both a reactant and a matrix agent. As further need arises, a method may also be used which combines the use of two, three or more types of polymer as the above mentioned matrix agent or reactant. In addition, a method exists whereby said fine crystal spherical carbon into which hydrogen or a halogen is introduced beforehand using an alkyl halide or hydrogen; an inorganic or organic compound containing a hydrogen or halogen element; or solid, liquid or gaseous hydrogen or a halogen, into an organic polymer or non-conductive liquid or solid. A further method exists whereby said carbon particles are dispersed and immobilized in an organic polymer or non-conductive liquid or solid, etc., either before introduction of the hydrogen or halogen or at some point during their introduction, and then the above mentioned carbon particles are reacted by the diffusion of chemicals which introduce the hydrogen or halogen, in order to introduce additional hydrogen or halogen into said fine crystal spherical carbon.

The substance used as an organic polymer or, when introducing said hydrogen or halogen, an organic high molecular matrix material, is not limited to any one kind, and include an acrylic resin such as polymethylmethacrylate, a vinyl resin, a polystyrene resin, a polyvinyl alcohol resin, a polyester such as polyethylene terephthalate, polyethylene-2,6-naphthalate, polyethylene oxide, etc., a polyolefin such as polypropylene, etc., a cellulose derivative such as cellulose triacetate, cellulose diacetate, etc., or a plastic such as a polyamide, a polycarbonate, etc. However, when employing a method whereby the above described fine crystal spherical carbon is dispersed in a viscous solution of an organic polymer, causing a catalytic effect to introduce at least one of hydrogen or a halogen element such as fluorine, chlorine, bromine or iodine into the carbon, it is necessary for these organic polymers to have at least one of hydrogen or a halogen element such as fluorine, chlorine, bromine or iodine.

In addition, the substances which may be used as the non-conductive liquid or solid include a saturated hydrocarbon, an unsaturated hydrocarbon, a cyclic hydrocarbon, an aromatic compound, and their ethers and esters and those containing a hetero atom.

The composition ratio of the above mentioned organic polymer or non-conductive liquid or solid to the above mentioned carbon particles is 100 to 1–1000 parts by weight, with 2–900 parts per weight preferred for the latter. If the composition ratio of the carbon particles increases in excess of the above composition ratio, then it is difficult to achieve an effective ferromagnetism. Also, if it falls below the above composition ratio then the magnetism becomes too weak.

In addition, the introduction of the halogen may be done using a halogen element or a halogen compound such as a halide, etc. Such a case employs a method by which a halogen-introduced fullerene is dispersed in said high-molecular compound or non-conductive liquid or solid, or a method by which halogen is introduced after dispersion of the carbon in said polymer or non-conductive liquid or solid. For example, in the case of fluorine introduction, it may be done by using solid, liquid or gaseous fluorine, hydrogen fluoride, etc., or by using a salt of fluorine such as LiF, $LiPF_6$, $LiBF_6$, NaF, KF, RbF, CsF, etc. Likewise, for the other halogens, their introduction may be done by using their simple solid, liquid or gaseous simple substance or salts.

In addition, the solvent to be used may be arbitrarily chosen, but concretely include a polar solvent such as water, dimethylformamide, dimethylsulfoxide, etc.; a ketone such as acetone, methylethyl ketone, methylisobutyl ketone or cyclohexanone; an alcohol such as methanol, ethanol, propanol or butanol; an ester such as methyl acetate, ethyl acetate, butyl acetate, ethyl lactate, or ethylene glycol monoacetate; an ether such as glycol dimethyl ether, glycol monoethyl ether, dioxane or tetrahydrofuran; an aromatic hydrocarbon such as benzene, toluene or xylene; and a hydrocarbon halide such as methylene chloride, ethylene chloride, carbon tetrachloride, chloroform, or dichlorobenzene.

In the above manner, a magnetic substance may be obtained which has a fine crystal spherical carbon structure represented by $C_nX_m$ where n is an integer selected from the group consisting of 60, 70, 76, 84, etc., m represents a positive number not more than n and not zero, and X represents at least one of hydrogen, fluorine, chlorine, bromine and iodine. The ground state spin multiplicity of this chemical may be considered to be in a doublet state.

Therefore, the generated magnetism may be easily affirmed by the electron spin resonance method.

In other words, if the ground state spin multiplicity is in a doublet state, then the energy level of the chemical undergoes zeeman split in proportion to the intensity of the external magnetic field. When the above mentioned magnetic substance is generated, it should be possible to obtain an electron spin resonance spectrum due to the transition between these zeeman levels, by dragging out a microwave of a determined frequency.

Also, it is possible to easily affirm the introduction of hydrogen, fluorine, chlorine, iodine or iodine into the fine crystal spherical carbon according to the above described process, by the nuclear magnetic resonance spectrum and element analysis procedures.

Since a magnetic substance according to the present invention is composed of a carbonaceous material and an organic polymer, it is extremely light and is easily treatable in comparison to oxides, metals, etc.

The following is a detailed explanation of the present invention based on concrete experimental results, but it need not be mentioned that the present invention is not limited to these examples.

EXAMPLE 1

Forty mg of a typical polymer, polystyrene ($[-CH(C_6H_5)-CH_2-]_n$) was dissolved in 2 ml of a polar solvent, tetrahydrofuran (THF), to obtain a viscous solution.

Next, 10 mg of fine crystal spherical carbon ($C_{60}$) was added to the solution, and was mixed by the radiation of ultrasonic rays to adequately disperse the fine crystal spherical carbon. Further, a fluorine introducing agent in an equimolar quantity as the above mentioned fine crystal spherical carbon ($C_{60}$) was added to the resulting dispersion in dry air, which was then sealed, and ultrasonic rays were applied to the dispersion to provide an adequately uniform mixture. The thus prepared dispersion solution was then allowed to stand at room temperature in a dark place.

The thus obtained solution was then transferred to a quartz sample tube with an external diameter of 2 mm, and the electron spin resonance spectrum was measured. The hysteresis curve (M—H loop) for the strong magnetic substance obtained by drying the above mentioned dispersion solution was measured both at normal temperature and liquid nitrogen temperature, and the g value was determined by the comparison with the absorption curve of a manganese marker.

Figure 2:
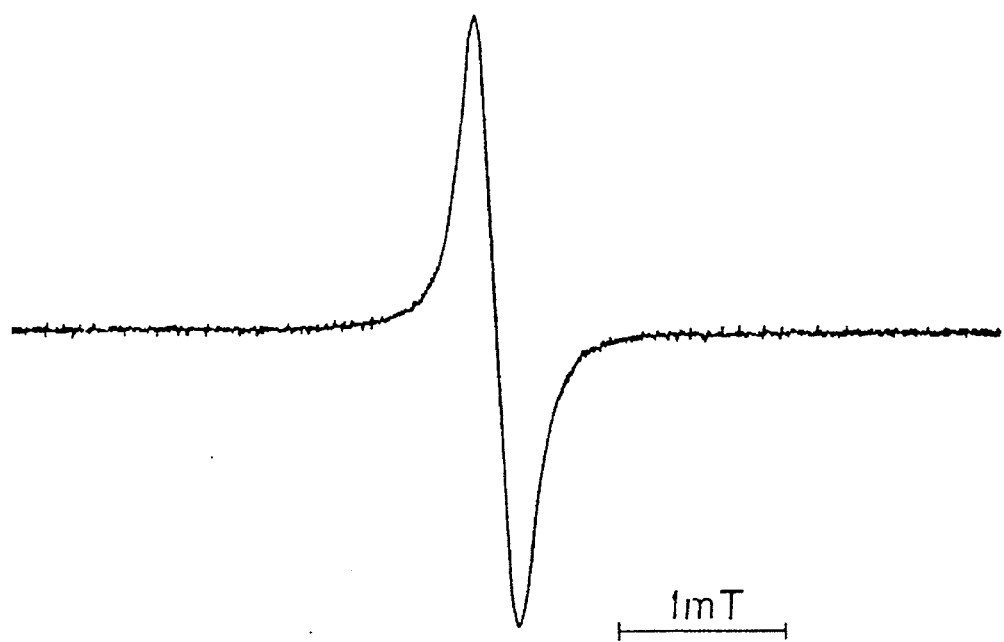
FIG. 2 is an electron spin resonance spectrum of the dispersion solution according to Example 1.

FIG. 2 shows an electron spin resonance spectrum which was obtained for a solution which was preserved for one hour at room temperature in a dark place.

Solutions of polystyrene in THF are extremely viscous. But, in the above solution, about 20 to 30 minutes after dispersing $C_{60}$ and further adding the fluorine introducing agent $LiPF_6$, the viscosity decreased, and thus it was supposed that the decomposition of the polymer was accelerated.

Here, if the main chain of the polymer is broken an σ-type radical is formed, but generally this type radical cannot exist stably under conditions of normal temperature and in the presence of oxygen. This became clear also from the fact that no ultra-minute bonding pattern was observed for the obtained electron spin resonance spectrum; the pattern is expected to split on the order of several mT by the H or F nucleus expected for the σ radicals resulting from the breakage of the main chain.

Figure 3:
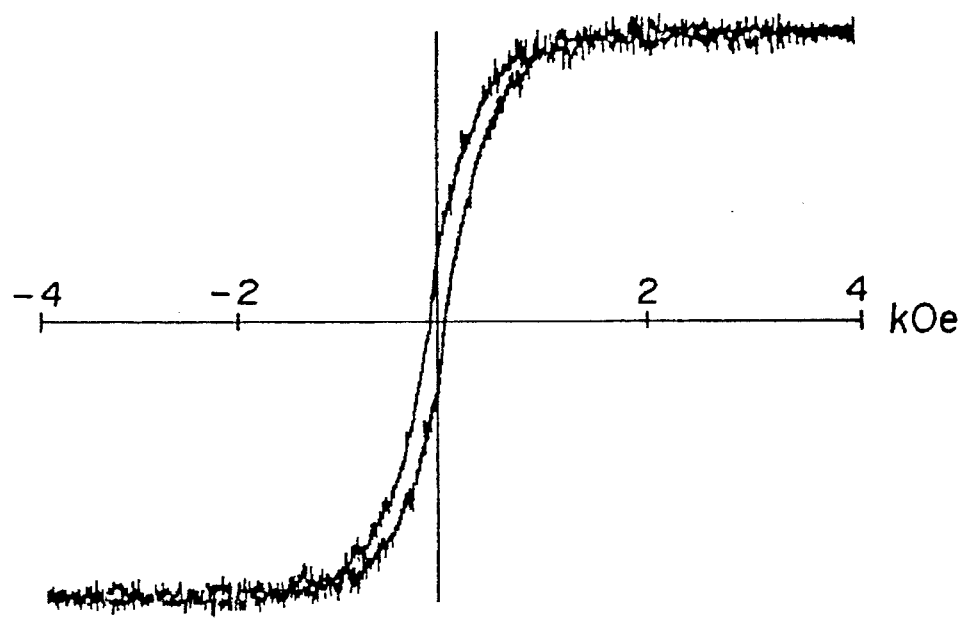
FIG. 3 is a magnetism hysteresis curve of the dried sample according to Example 1.

Also, when the hysteresis curve (M—H loop) of the strong magnetic substance obtained by drying the above mentioned dispersion solution was measured at room temperature using a vibratory sample magnetometer (VSM), the result shown in FIG. 3 was obtained as evidence of its ferromagnetism. The value of the saturation magnetic susceptibility of the sample was 0.011 emu/g.

It was thus clearly shown that introduction of the fluorine into the $C_{60}$ occurred, and that the $C_{60}$ derivative possessed magnetism. Incidentally, when analysis was made of the sample by atomic absorption analysis, the weight percentage of iron and other transition metals was less than the detectable limit of 0.001.

EXAMPLE 2

Forty mg of a typical vinyl halide polymer, vinyl polychloride ($[-CHCl-CH_2-]_n$) was dissolved in 2 ml of a polar solvent, dimethylformamide (DMF) to obtain a viscous solution.

Next, 10 mg of fine crystal spherical carbon ($C_{60}$) was added to this solution, which was then mixed using ultrasonic rays, sealed, and then allowed to stand at room temperature in a dark place.

The thus obtained dispersion solution was then transferred to a quartz sample tube with an external diameter of 2 mm, and the electron spin resonance spectrum was measured. This measurement was done both at normal temperature and liquid nitrogen temperature, and the g value was determined by the comparison with the absorption curve of a manganese marker.

Figure 4:
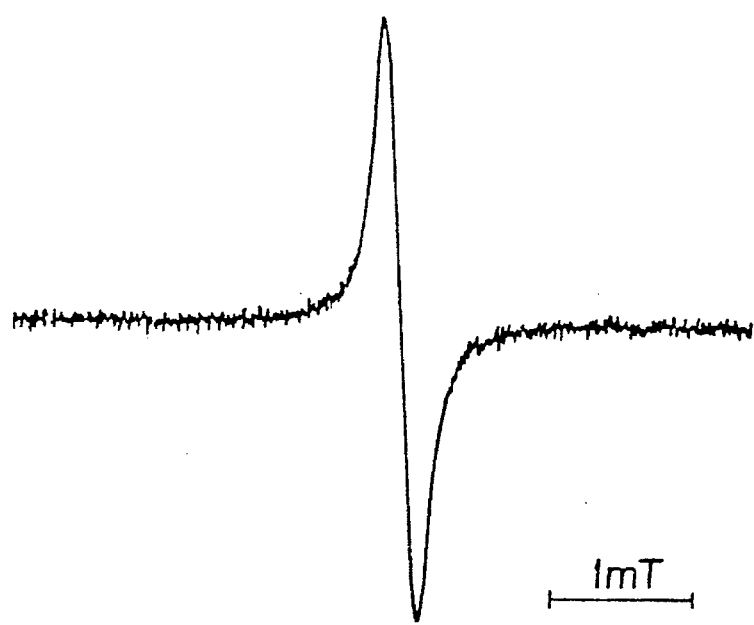
FIG. 4 is an electron spin resonance spectrum of the dispersion solution according to Example 2.
Figure 5:
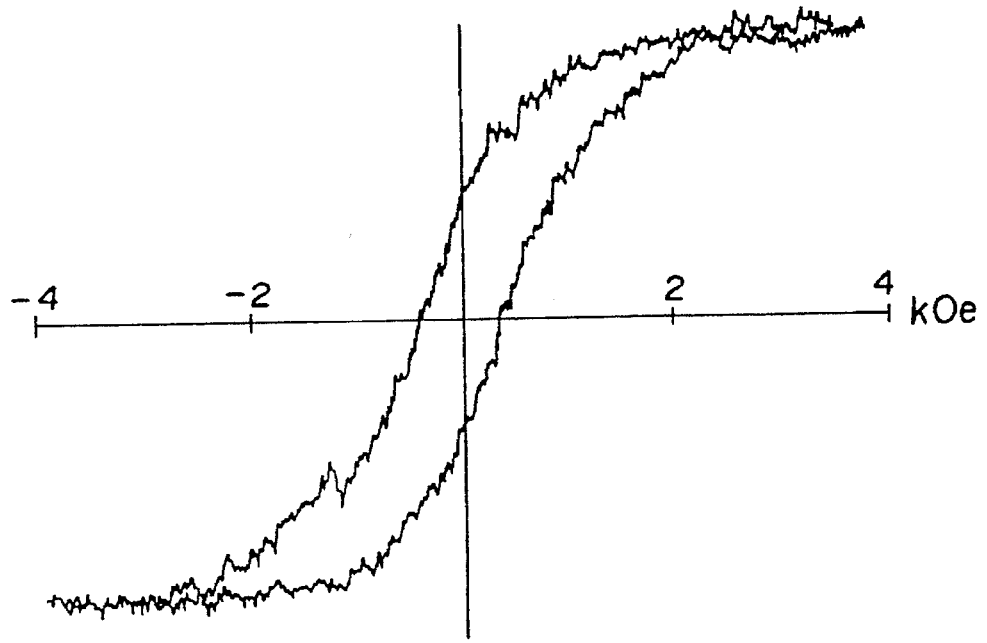
FIG. 5 is a magnetism hysteresis curve of the dried sample according to Example 2.

FIG. 4 shows an electron spin resonance spectrum which was obtained for a solution which was preserved for one week at room temperature in a dark place.

Here, if the main chain of the polymer is broken an σ-type radical is formed, but generally this type radical cannot exist stably under conditions of normal temperature and pressure and in the presence of oxygen. This became clear also from the fact that no ultra-minute bonding pattern was observed for the obtained electron spin resonance spectrum; the pattern is expected to split on the order of several mT by the H or Cl nucleus expected for the σ radicals resulting from the breakage of the main chain. Further, even when the solution was chilled to liquid nitrogen temperature, no presence of any triplet chemical was observed, nor was the existence of any chemical of a high spin multiplicity confirmed.

Also, when measurement was made at room temperature of the hysteresis curve (M—H loop) for the $C_{60}$, which was produced by drying to hardness the DMF of the above mentioned dispersion solution and introducing chlorine thereinto, as well as of the remaining vinyl polychloride mixture, the result shown in FIG. 3 was obtained as evidence of its ferromagnetism. The value of the saturation magnetic susceptibility σs of the sample was 0.015 emu/g.

It was thus clearly shown that introduction of the chlorine into the $C_{60}$ occurred, and that the $C_{60}$ derivative possessed magnetism. Incidentally, when analysis was made of the sample by atomic absorption analysis, the weight percentage of iron and other transition metals, was less than the detectable limit of 0.001.

EXAMPLE 3

Forty mg of a typical vinyl polymer, vinyl polyacetate ([—CH(OCOCH$_3$)—CH$_2$—]$_n$) was dissolved in 2 ml of a polar solvent, dimethylformamide (DMF) to obtain a viscous solution.

Next, 10 mg of fine crystal spherical carbon ($C_{60}$) was added to this solution, which was then mixed using ultrasonic rays, sealed, and then allowed to stand at room temperature in a dark place.

The thus obtained dispersion solution was then transferred to a quartz sample tube with an external diameter of 2 mm, and the electron spin resonance spectrum was measured. This measurement was done both at normal temperature and liquid nitrogen temperature, and the g value was determined by the comparison with the absorption curve of a manganese marker.

Figure 6:
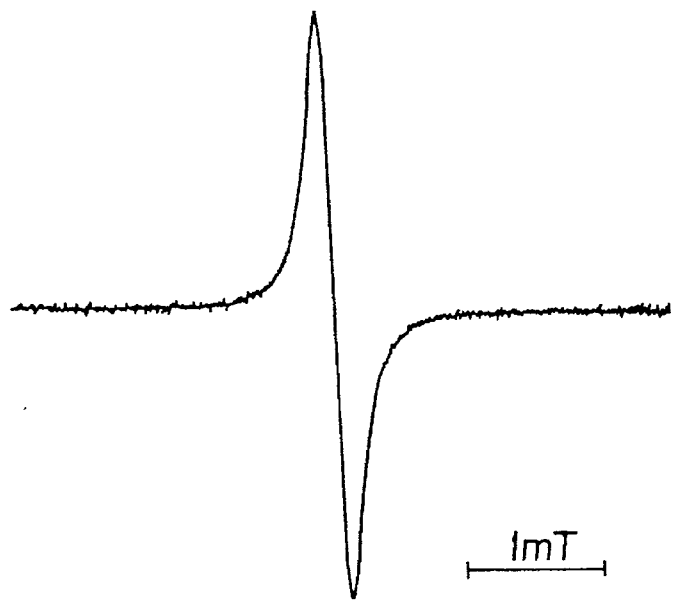
FIG. 6 is an electron spin resonance spectrum of the dispersion solution according to Example 3.

FIG. 6 shows an electron spin resonance spectrum which was obtained for a solution which was preserved for one week at room temperature in a dark place.

Here, if the main chain of the polymer is broken an σ-type radical is formed, but generally this type radical can not exist stably under conditions of normal temperature and pressure and in the presence of oxygen. This became clear also from the fact that no ultra-minute bonding pattern was observed for the obtained electron spin resonance spectrum; the pattern is expected to split on the order of several mT by the H nucleus expected for the σ radicals resulting from the breakage of the main chain. Further, even when the solution was chilled to liquid nitrogen temperature, no presence of any triplet chemical was observed, nor was the existence of any chemical of a high spin multiplicity confirmed.

Figure 7:
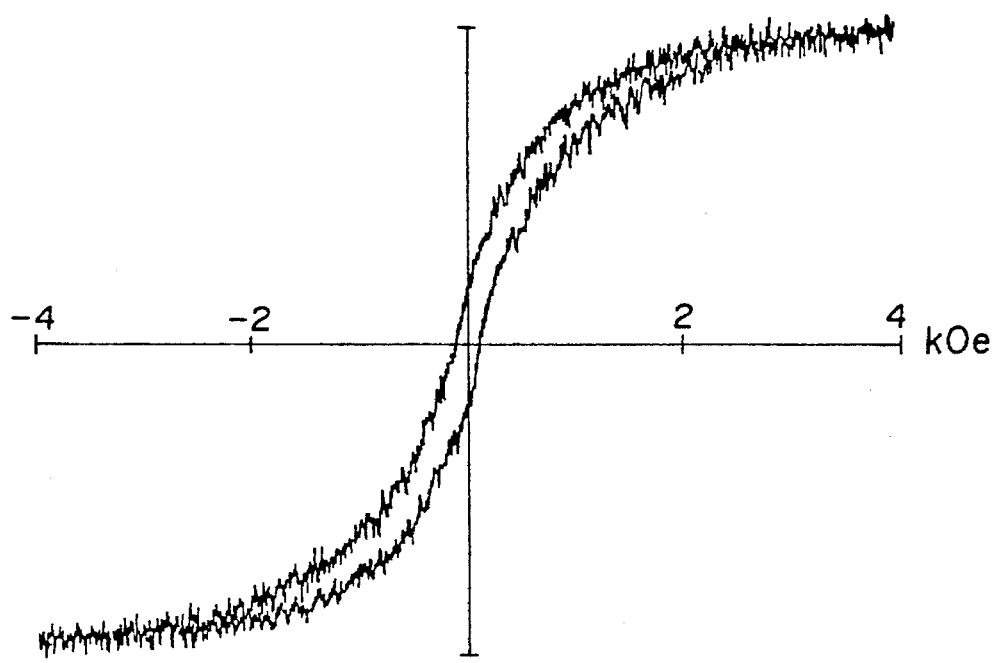
FIG. 7 is a magnetism hysteresis curve of the dried sample according to Example 3.

Also, when measurement was made at room temperature of the hysteresis curve (M—H loop) for the $C_{60}$ which was produced by drying to hardness the DMF of the above mentioned dispersion solution and later subjecting it to an addition reaction, as well as of the remaining vinyl polyacetate mixture, the result shown in FIG. 7 was obtained as evidence of its ferromagnetism. The value of the saturation magnetic susceptibility σs of the sample was 0.048 emu/g. Incidentally, when analysis was made of the sample by atomic absorption analysis, the weight percentage of iron and other transition metals was less than the detectable limit of 0.001.

EXAMPLE 4

Forty mg of a typical vinyl halide polymer, vinyl chloride/vinyl acetate copolymer ([—CHCl—CH$_2$—]$_n$—[CH(OCOCH$_3$—CH$_2$—]$_m$) was dissolved in 2 ml of a polar solvent, dimethylformamide (DMF) to obtain a viscous solution.

Next, 10 mg of fine crystal spherical carbon ($C_{60}$) was added to this solution, which was then mixed using ultrasonic rays, sealed, and then allowed to stand at room temperature in a dark place.

The thus obtained dispersion solution was then transferred to a quartz sample tube with an external diameter of 2 mm, and the electron spin resonance spectrum was measured. This measurement was done both at normal temperature and liquid nitrogen temperature, and the g value was determined by the comparison with the absorption curve of a manganese marker.

Figure 8:
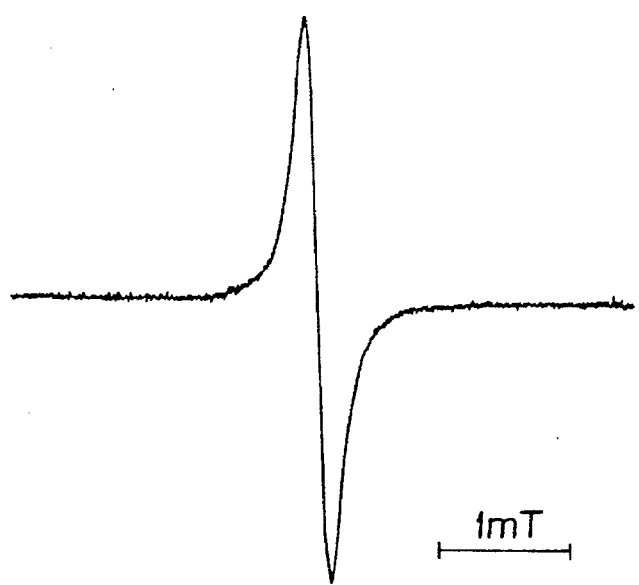
FIG. 8 is an electron spin resonance spectrum of the dispersion solution according to Example 4.

FIG. 8 shows an electron spin resonance spectrum which was obtained for a solution which was preserved for two weeks at room temperature in a dark place.

Here, if the main chain of the polymer is broken an σ-type radical is formed, but generally this type radical cannot exist stably under conditions of normal temperature and pressure and in the presence of oxygen. This became clear also from the fact that no ultra-minute bonding pattern was observed for the obtained electron spin resonance spectrum; the pattern is expected to split on the order of several mT by the H or Cl nucleus expected for the σ radicals resulting from the breakage of the main chain. Further, even when the solution was chilled to liquid nitrogen temperature, no presence of any triplet chemical was observed, nor was the existence of any chemical of a high spin multiplicity confirmed.

Figure 9:
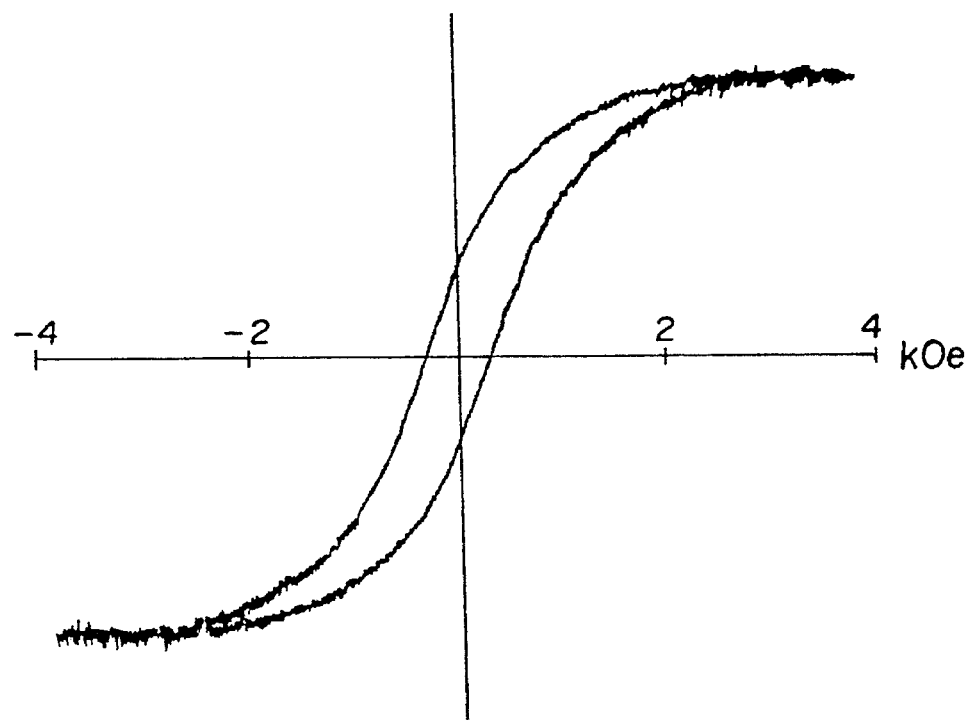
FIG. 9 is a magnetism hysteresis curve of the dried sample according to Example 4.

Also, when measurement was made at room temperature of the hysteresis curve (M—H loop) for the $C_{60}$ which was produced by drying to hardness the DMF of the above mentioned dispersion solution and introducing said functional group thereinto, as well as of the remaining vinyl chloride/vinyl acetate copolymer mixture, the result shown in FIG. 9 was obtained as evidence of its ferromagnetism. The value of the saturation magnetic susceptibility σs of the sample was 0.052 emu/g. Incidentally, when analysis was made of the sample by atomic absorption analysis, the weight percentage of iron and other transition metals was less than the detectable limit of 0.001.

It was thus clearly shown that the addition reaction occurred in the $C_{60}$, and that the $C_{60}$ derivative possessed magnetism. Incidentally, when analysis was made of the sample by atomic absorption analysis, the weight percentage of iron and other transition metals was less than the detectable limit of 0.001.

EXAMPLE 5

Forty mg of a typical fluoride polymer, vinylidene polyfluoride ($-CH_2-CF_2-$)$_n$) was dissolved in 2 ml of a polar solvent, dimethylformamide (DMF) to obtain a viscous solution.

Next, 10 mg of fine crystal spherical carbon ($C_{60}$) was added to this solution, which was then mixed using ultrasonic rays, sealed, and then allowed to stand at room temperature in a dark place.

The thus obtained dispersion solution was then transferred to a quartz sample tube with an external diameter of 2 mm, and the electron spin resonance spectrum was measured. This measurement was done both at normal temperature and liquid nitrogen temperature, and the g value was determined by the comparison with the absorption curve of a manganese marker.

Figure 10:
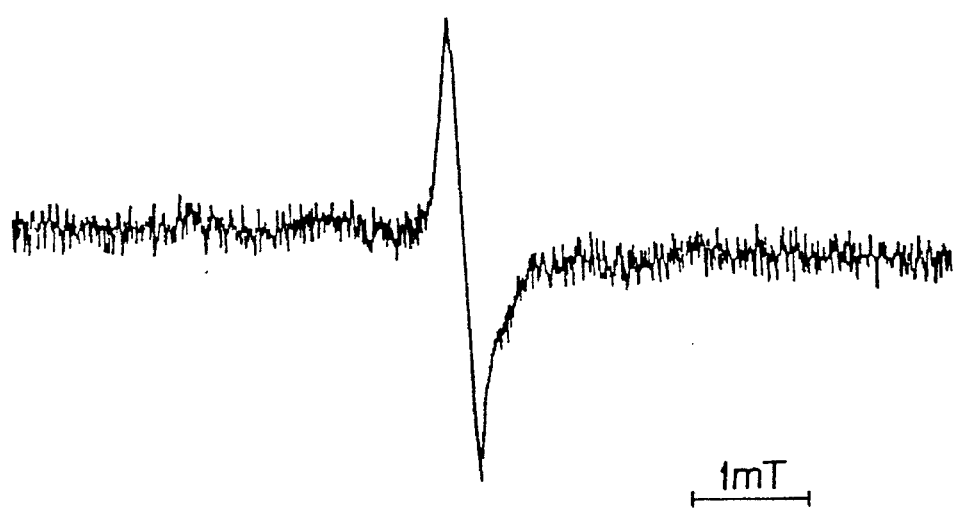
FIG. 10 is an electron spin resonance spectrum of the dispersion solution according to Example 5.

FIG. 10 shows an electron spin resonance spectrum which was obtained for a solution into which 10 mg of $C_{60}$ was dispersed, and which was preserved for two weeks at room temperature in a dark place.

Here, when the $C_{60}$ was added to a viscous solution of the polymer in DMF, complete gelation occurred after a few hours, and a supernatant of DMF appeared. The gel component was removed, was then transferred to a quartz tube with an external diameter of 5 mm, and the spectrum obtained was that shown in FIG. 10.

Figure 11:
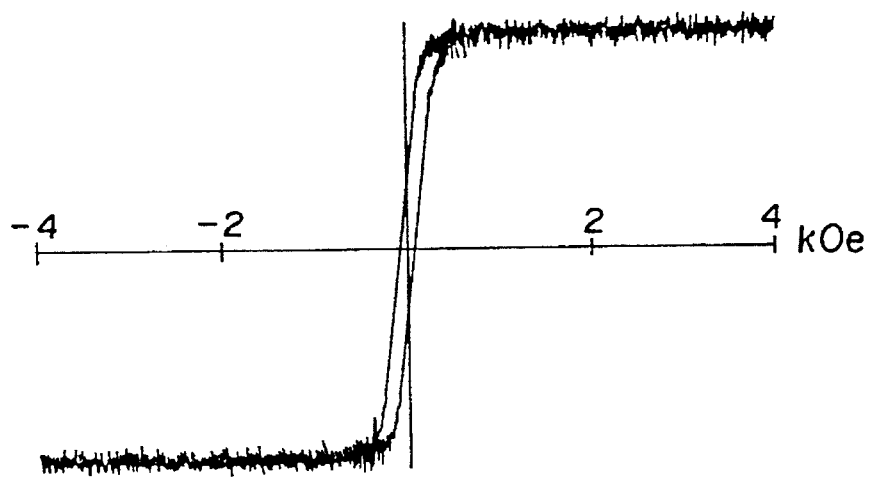
FIG. 11 is a magnetism hysteresis curve of the dried sample according to Example 5.

Also, the hysteresis curve (M—H loop) of the sample which was obtained by drying to hardness the DMF of the above mentioned dispersion solution was measured at room temperature using a vibratory sample magnetometer (VSM), the result shown in FIG. 11 was obtained as evidence of its ferromagnetism. The value of the saturation magnetic susceptibility as of the sample was 0.034 emu/g.

Incidentally, when analysis was made of the sample by atomic absorption analysis, the weight percentage of iron and other transition metals, was less than the detectable limit of 0.001.

EXAMPLE 6

Forty mg of a vinyl halide polymer, vinylidene fluoride/trifluoroethylene monochloride copolymer ([$-CF_2-CH_2-$]$_n-$[$-CFCl-CF_2-$]$_m$) was dissolved in 2 ml of a polar solvent, tetrahydrofuran (THF) to obtain a viscous solution.

Next, 10 mg of fine crystal spherical carbon ($C_{60}$) was added to this solution, which was then mixed using ultrasonic rays, sealed, and then allowed to stand at room temperature in a dark place.

The thus obtained dispersion solution was then transferred to a quartz sample tube with an external diameter of 2 mm, and the electron spin resonance (ESR) spectrum was measured. This measurement was done under normal temperature, and the g value was determined by the comparison with the absorption curve of a manganese marker.

Figure 12:
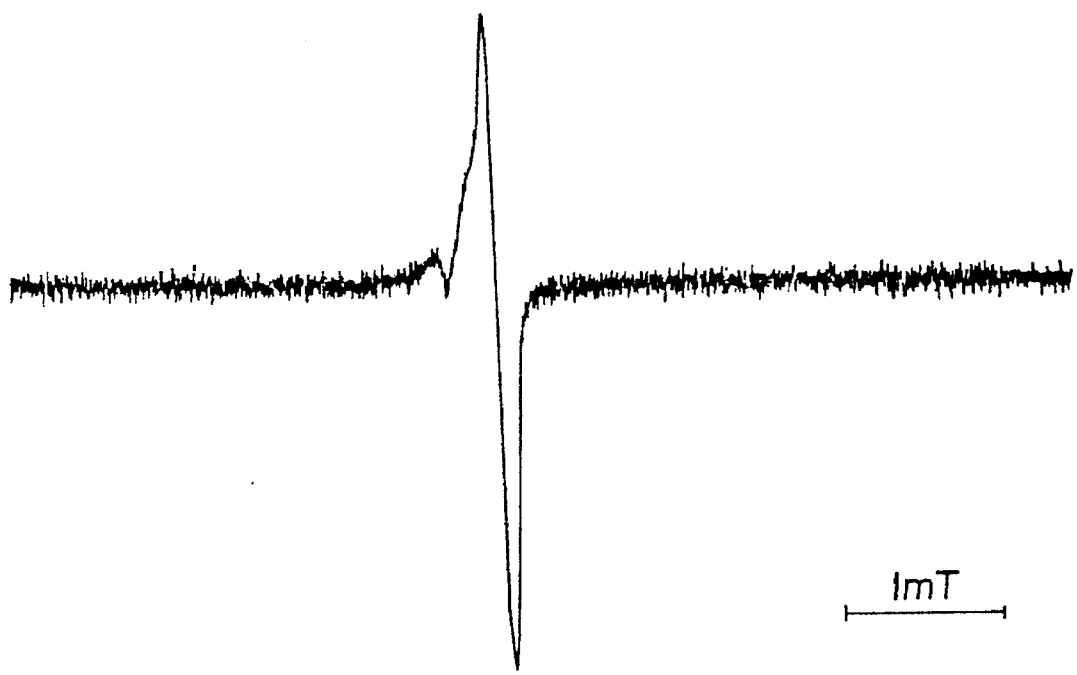
FIG. 12 is an electron spin resonance spectrum of the dispersion solution according to Example 6.

FIG. 12 shows an electron spin resonance spectrum which was obtained for a solution which was preserved for one week at room temperature in a dark place.

Here, if the main chain of the polymer is broken an σ-type radical is formed, but generally this type radical cannot exist stably under conditions of normal temperature and pressure and in the presence of oxygen. This became clear also from the fact that no ultra-minute bonding pattern was observed for the obtained electron spin resonance spectrum; the pattern is expected to split on the order of several mT by the H, F or Cl nucleus expected for the σ radicals resulting from the breakage of the main chain.

Figure 13:
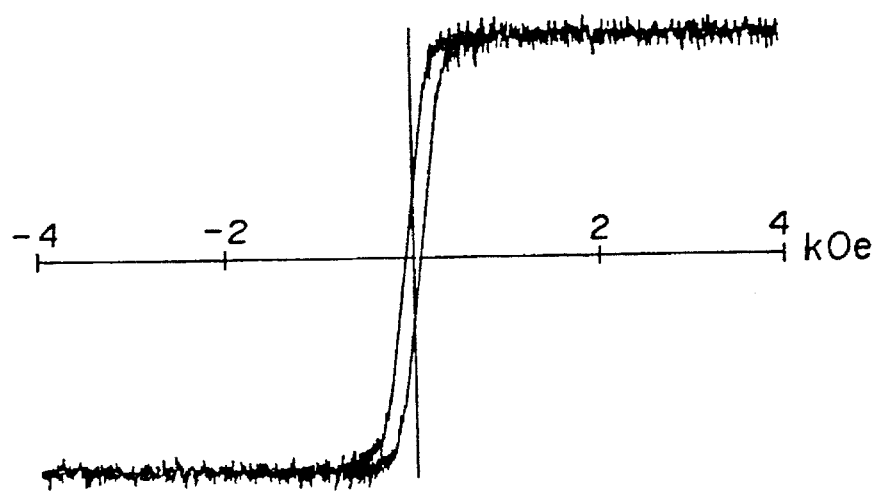
FIG. 13 is a magnetism hysteresis curve of the dried sample according to Example 6.

Also, the hysteresis curve (M—H loop) of the sample which was obtained by drying to hardness the THF of the above mentioned dispersion solution was measured at room temperature using a vibratory sample magnetometer (VSM), the result shown in FIG. 13 was obtained as evidence of its ferromagnetism. The value of the saturation magnetic susceptibility σs of the sample was 0.0028 emu/g.

Incidentally, when analysis was made of the sample by atomic absorption analysis, the weight percentage of iron and other transition metals, was less than the detectable limit of 0.001.

EXAMPLE 7

Figure 14:
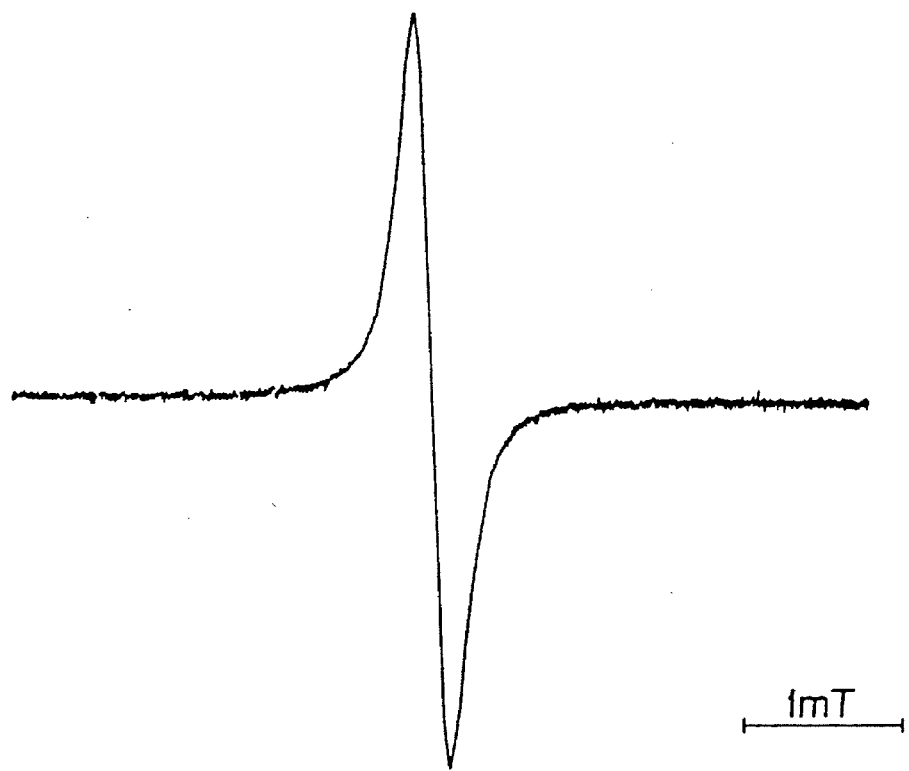
FIG. 14 is an electron spin resonance spectrum of the dispersion solution according to Example 7.
Figure 15:
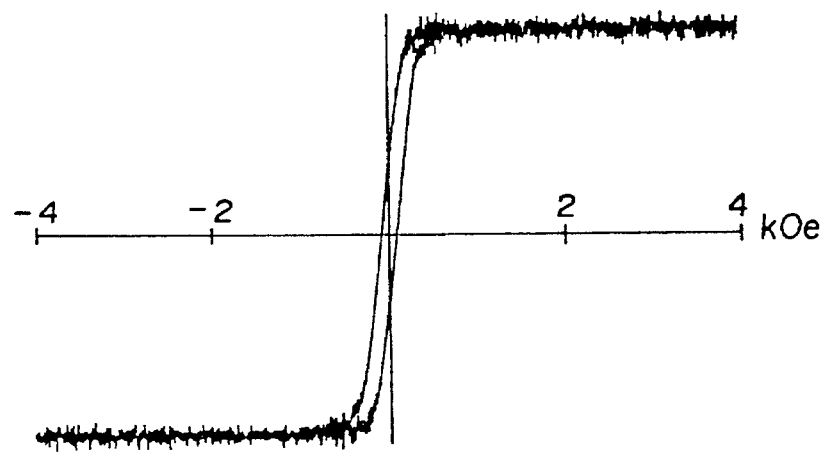
FIG. 15 is a magnetism hysteresis curve of the dried sample according to Example 7.

In the same manner as Example 6, testing was done utilizing poly (styrene, 2-bromide) as the halide polymer. FIG. 14 shows the ESR spectrum for the dispersion solution. Also, FIG. 15 shows the hysteresis curve for the sample produced by drying to hardness the THF. The value of the saturation magnetism of this sample was 0.0054 emu/g.

EXAMPLE 8

Figure 16:
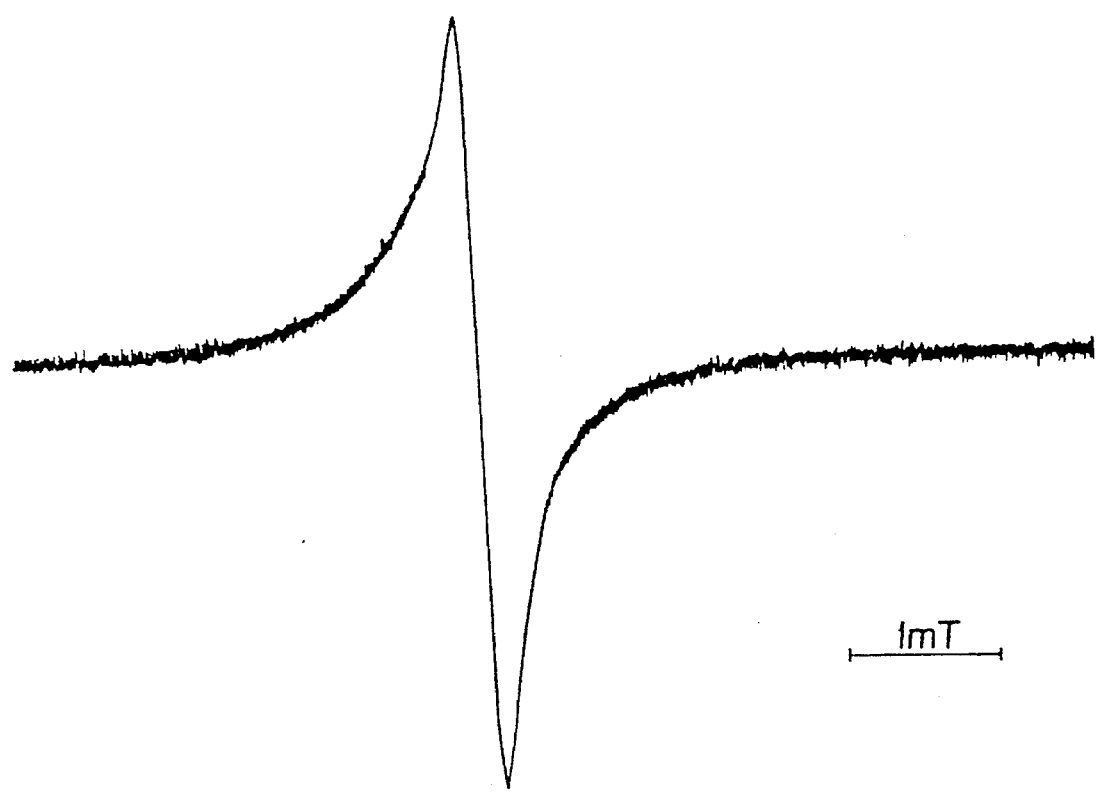
FIG. 16 is an electron spin resonance spectrum of the dispersion solution according to Example 8.
Figure 17:
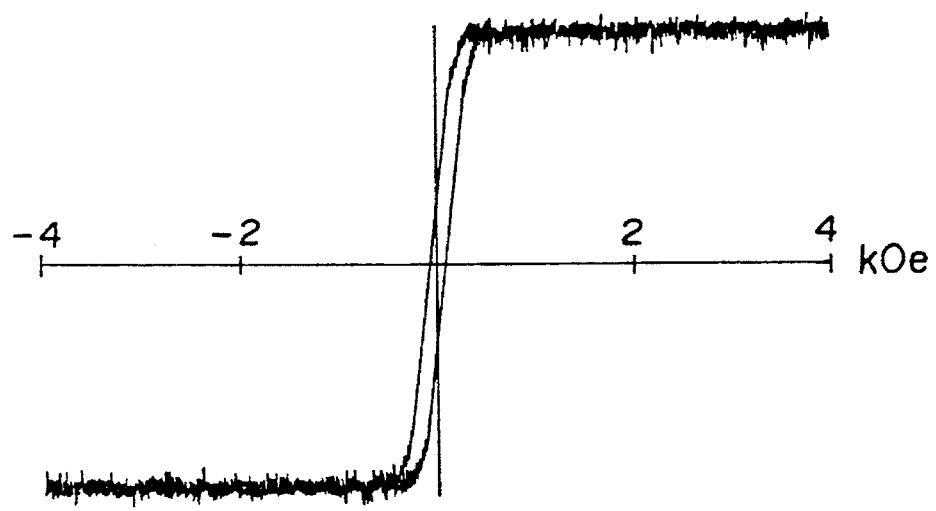
FIG. 17 is a magnetism hysteresis curve of the dried sample according to Example 8.

In the same manner as Example 6, testing was done utilizing vinyl chloride/vinyl acetate/vinyl alcohol copolymer as the halide polymer. FIG. 16 shows the ESR spectrum for the dispersion solution. Also, FIG. 17 shows the hysteresis curve for the sample produced by drying the THF to hardness. The value of the saturation magnetism of this sample was 0.0019 emu/g.

EXAMPLE 9

Figure 18:
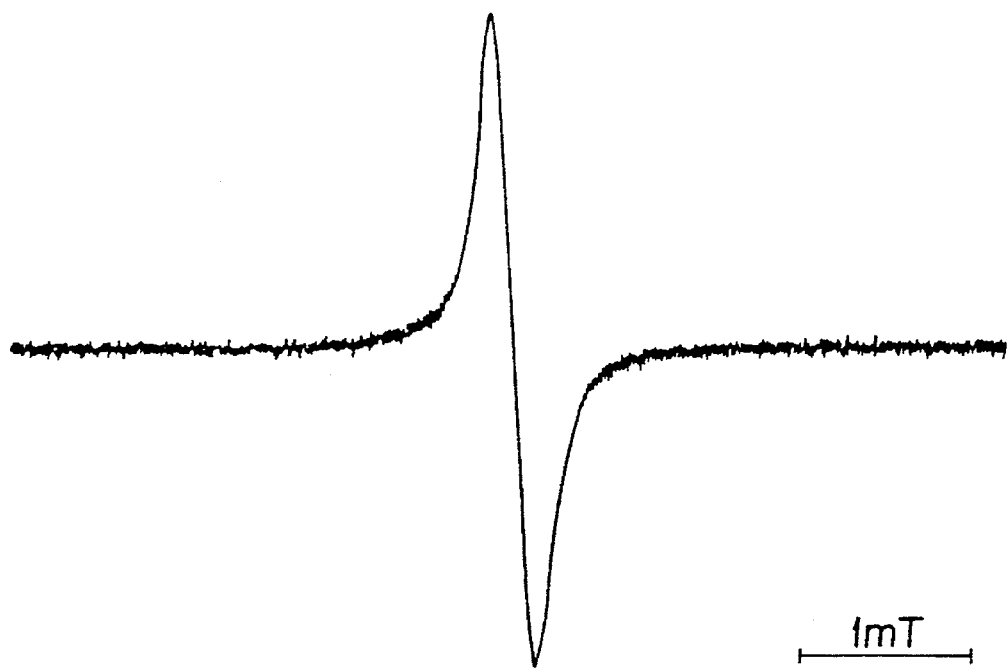
FIG. 18 is an electron spin resonance spectrum of the dispersion solution according to Example 9.
Figure 19:
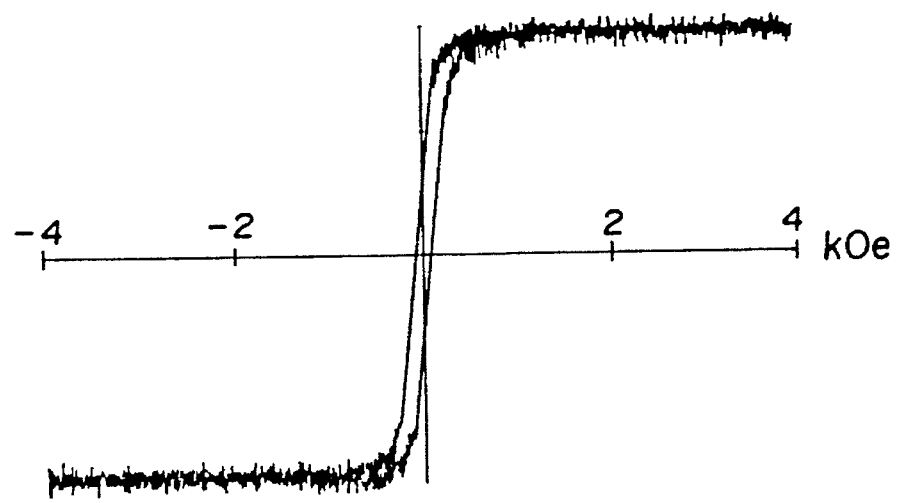
FIG. 19 is a magnetism hysteresis curve of the dried sample according to Example 9.

In the same manner as Example 6, testing was done utilizing isotactic polypropylene chloride as the halide polymer. FIG. 18 shows the ESR spectrum for the dispersion solution. Also, FIG. 19 shows the hysteresis curve for the sample produced by drying the THF to hardness. The value of the saturation magnetism of this sample was 0.0007 emu/g.

EXAMPLE 10

Ten mg of fine crystal spherical carbon $C_{60}$ was added to 2 ml of a polar solvent, tetrahydrofuran (THF). Then LiF was further added at double the molar amount of said fine crystal spherical carbon, and the solution was mixed by irradiation of ultrasonic waves, after which it was sealed and allowed to stand at room temperature in a dark place.

The thus obtained dispersion solution was then transferred to a quartz sample tube with an external diameter of 2 mm, and the electron spin resonance (ESR) spectrum was measured. This measurement was done under normal temperature and the g value was determined by the comparison with the absorption curve of a manganese marker.

Figure 20:
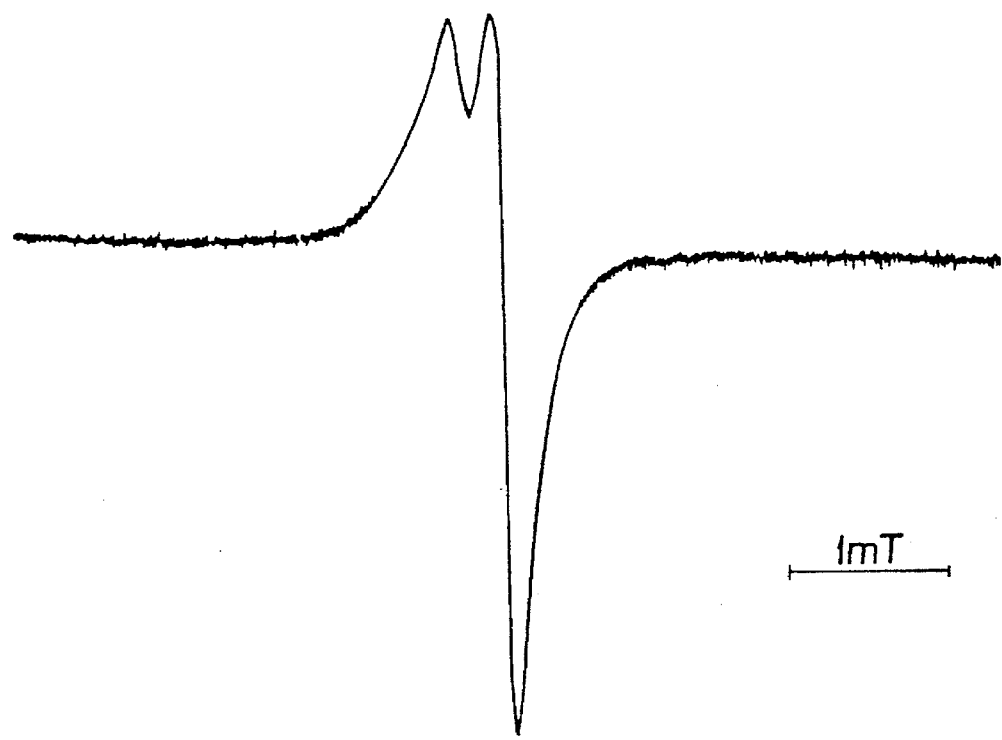
FIG. 20 is an electron spin resonance spectrum of the dispersion solution according to Example 10.

FIG. 20 shows an electron spin resonance spectrum which was obtained for a solution which was preserved for one week at room temperature in a dark place.

Figure 21:
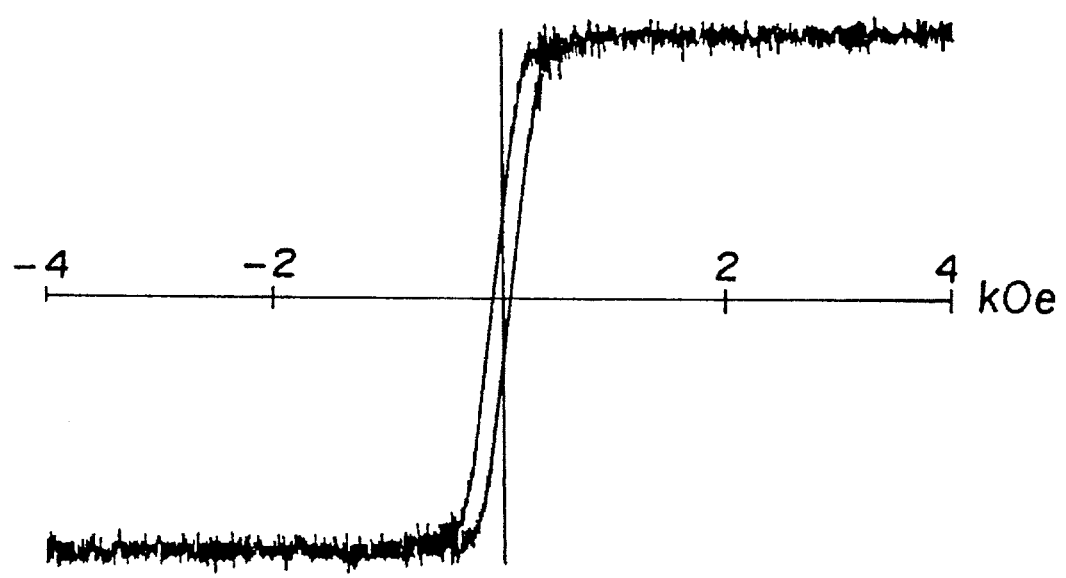
FIG. 21 is a magnetism hysteresis curve of the dried sample according to Example 10.

Next, 40 mg of a typical vinyl polymer, polystyrene ($[-CH(C_6H_5)-CH_2-]_n$) was added to this dispersion solution, and after further dispersion with irradiation of ultrasonic waves, the THF of said dispersion solution was dried to solid. When the hysteresis curve (M—H loop) of the sample was measured at room temperature using a vibratory sample magnetometer (VSM), the result shown in FIG. 21 was obtained as evidence of its ferromagnetism. The value of the saturation magnetic susceptibility σs of the sample was 0.0052 emu/g. Incidentally, when analysis was made of the sample by atomic absorption analysis, the weight percentage of iron and other transition metals, was less than the detectable limit of 0.001.

EXAMPLE 11

Figure 22:
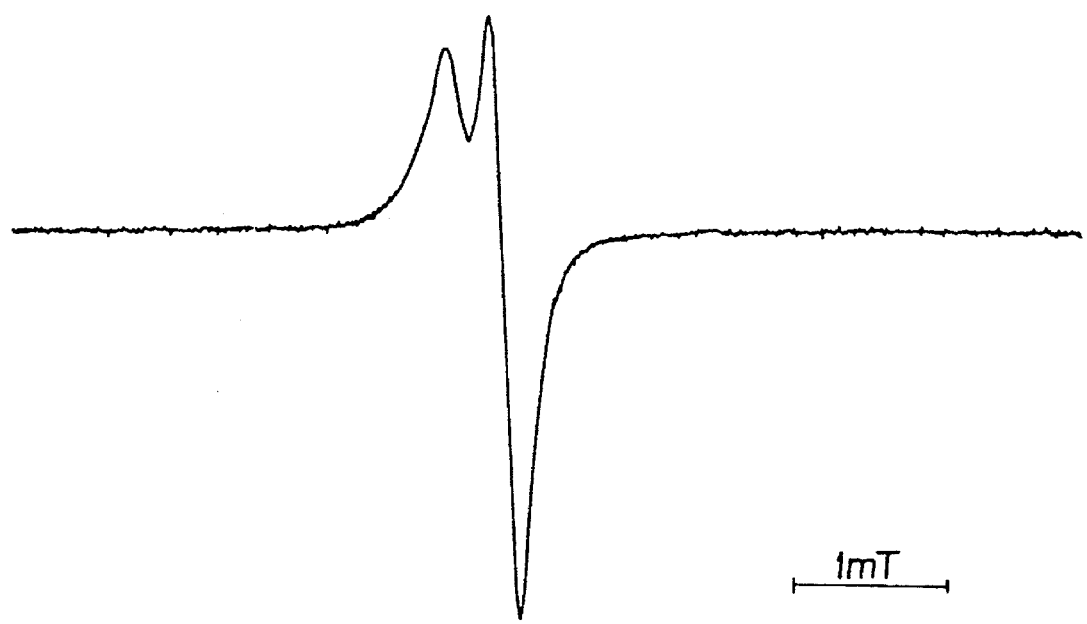
FIG. 22 is an electron spin resonance spectrum of the dispersion solution according to Example 11.
Figure 23:
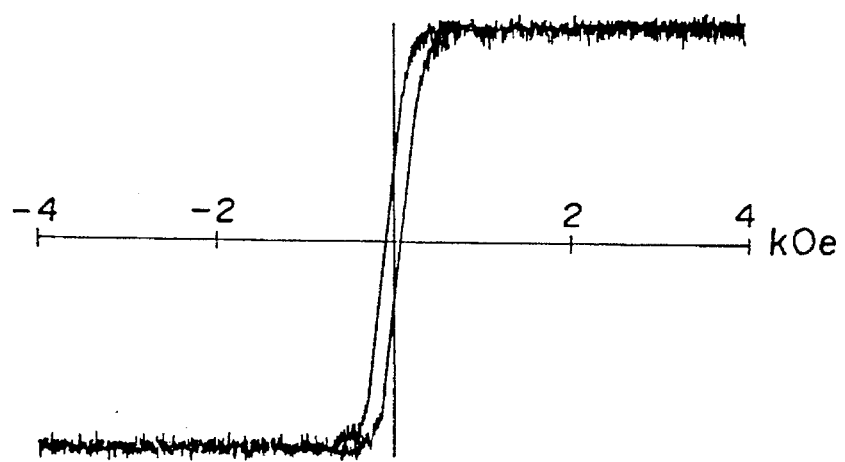
FIG. 23 is a magnetism hysteresis curve of the dried sample according to Example 11.

In the same manner as Example 10, testing was done substituting KI for LiF. FIG. 22 shows the ESR spectrum for the dispersion solution, and FIG. 23 shows the results of the VSM measurement. The ferromagnetism of this sample was thus confirmed, and the value of the saturation magnetism σs of the sample was 0.0068 emu/g.

EXAMPLE 12

Figure 24:
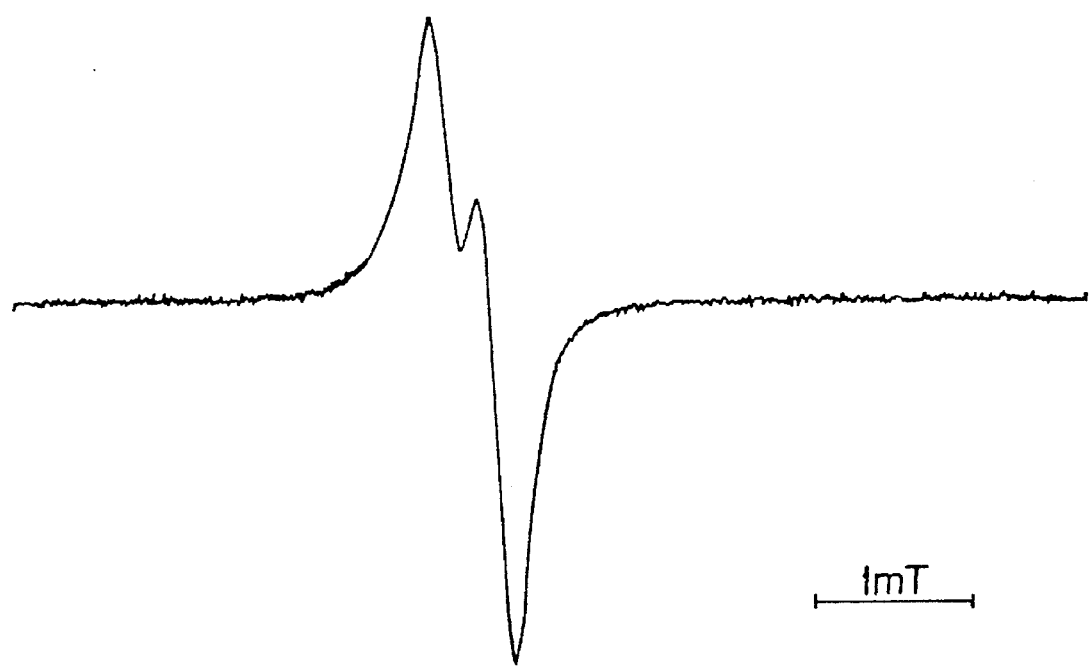
FIG. 24 is an electron spin resonance spectrum of the dispersion solution according to Example 12.
Figure 25:
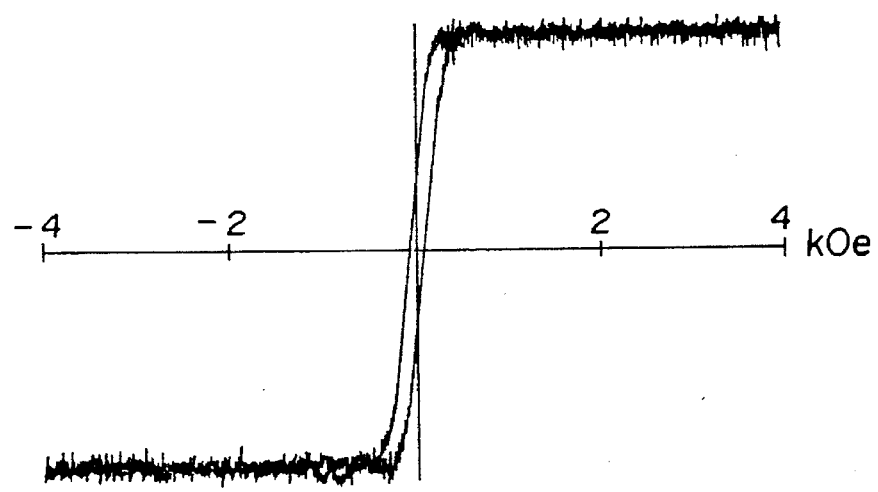
FIG. 25 is a magnetism hysteresis curve of the dried sample according to Example 12.

In the same manner as Example 10, testing was done substituting NaF for LiF. FIG. 24 shows the ESR spectrum for the dispersion solution, and FIG. 25 shows the results of the VSM measurement. The ferromagnetism of this sample was thus confirmed, and the value of the saturation magnetism σs of the sample was 0.0073 emu/g.

EXAMPLE 13

Figure 26:
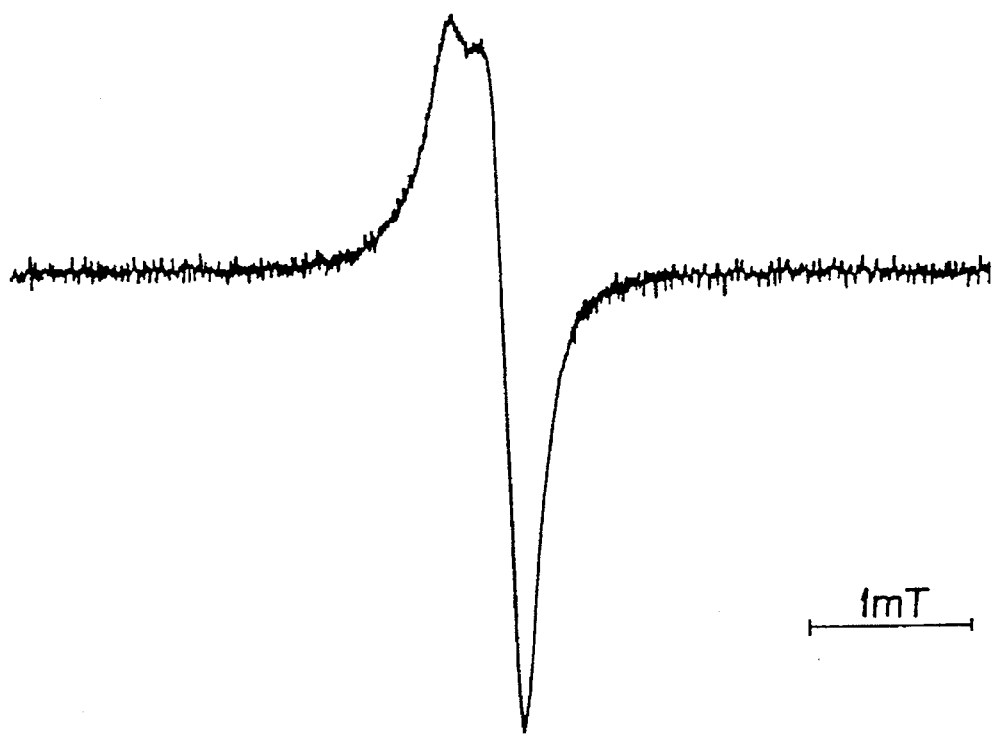
FIG. 26 is an electron spin resonance spectrum of the dispersion solution according to Example 13.
Figure 27:
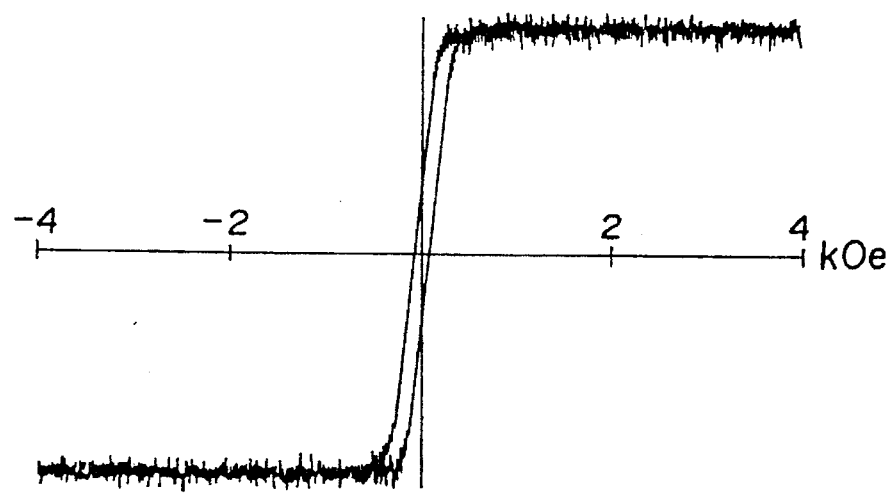
FIG. 27 is a magnetism hysteresis curve of the dried sample according to Example 13.

In the same manner as Example 10, testing was done substituting NaCl for LiF. FIG. 26 shows the ESR spectrum for the dispersion solution, and FIG. 27 shows the VSM measurement results. The ferromagnetism of this sample was thus confirmed, and the value of the saturation magnetism σs of the sample was 0.0092 emu/g.

EXAMPLE 14

Ten mg of fine crystal spherical carbon $C_{60}$ was added to 2 ml of a polar solvent, tetrahydrofuran (THF). Then solid iodine was further added at double the molar amount of said fine crystal spherical carbon, and the solution was mixed by irradiation of ultrasonic waves, after which it was sealed and allowed to stand at room temperature in a dark place.

The thus obtained dispersion solution was then transferred to a quartz sample tube with an external diameter of 2 mm, and the electron spin resonance (ESR) spectrum was measured. This measurement was done under normal temperature and the g value was determined by the comparison with the absorption curve of a manganese marker.

Figure 28:
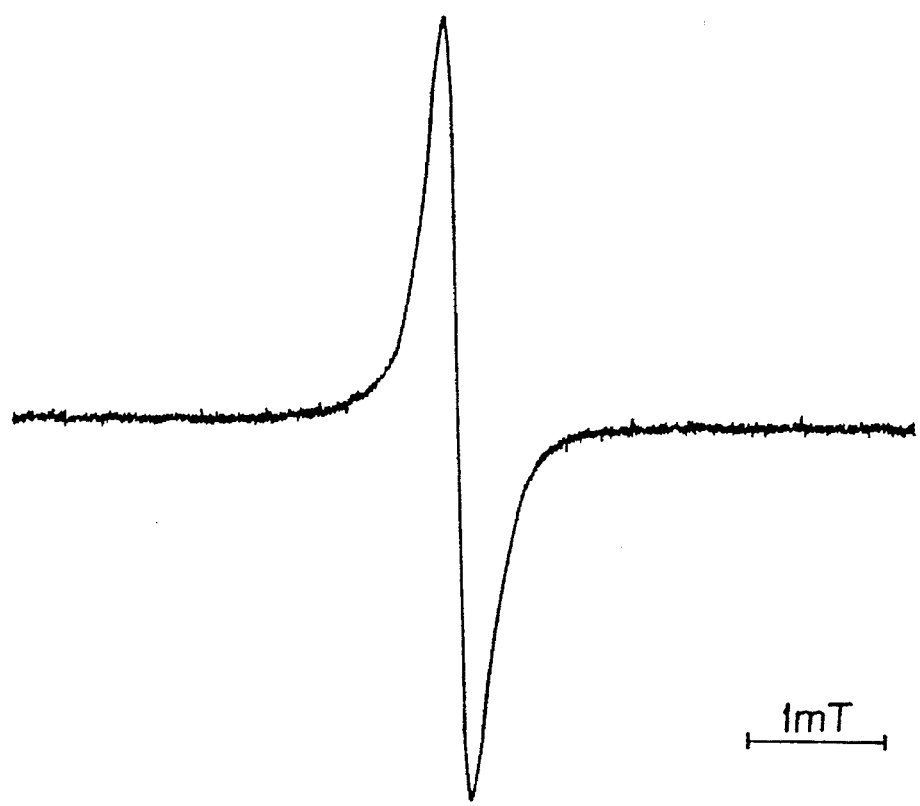
FIG. 28 is an electron spin resonance spectrum of the dispersion solution according to Example 14.

FIG. 28 shows an electron spin resonance spectrum which was obtained for a solution which was preserved for one week at room temperature in a dark place.

Figure 29:
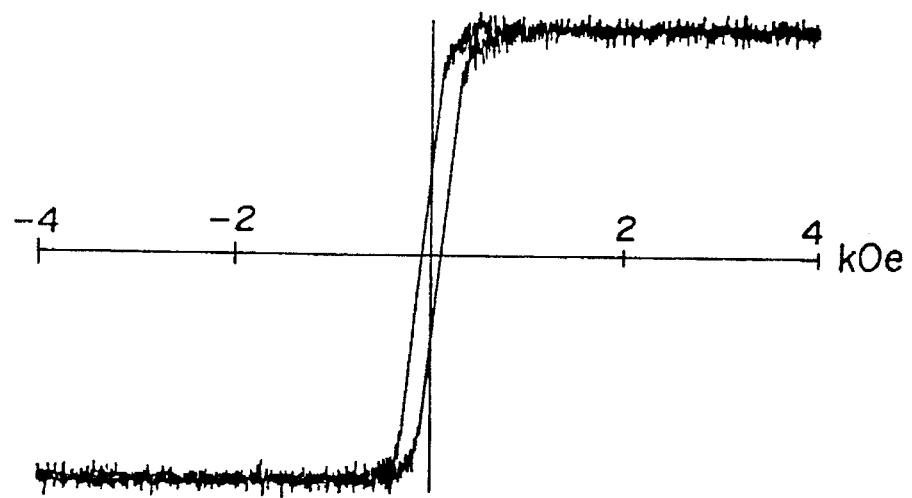
FIG. 29 is a magnetism hysteresis curve of the dried sample according to Example 14.

Next, 40 mg of a typical vinyl polymer, polystyrene ($[CH(C_6H_5)-CH_2-]_n$) was added to this dispersion solution, and after further dispersion with irradiation of ultrasonic waves, the THF of said dispersion solution was dried to solid. When the hysteresis curve (M—H loop) of the sample was measured at room temperature using a vibratory sample magnetometer (VSM), the result shown in FIG. 29 was obtained as evidence of its ferromagnetism. The value of the saturation magnetic susceptibility σs of the sample was 0.0024 emu/g. Incidentally, when analysis was made of the sample by atomic absorption analysis, the weight percentage of iron and other transition metals, was less than the detectable limit of 0.001.

EXAMPLE 15

Forty mg of a typical polymer, polystyrene ($[-CH(C_6H_5)-CH_2-]_n$) was dissolved in 2 ml of a polar solvent, tetrahydrofuran (THF) to obtain a viscous solution.

Next, 10 mg of fine crystal spherical carbon ($C_{60}$) was added to this solution, which was then mixed using ultrasonic rays, and adequately dispersed.

In addition, gaseous iodine was introduced into the above mentioned dispersion, which was then sealed, and allowed to stand at room temperature for one hour in a dark place.

The thus obtained solution was then transferred to a quartz sample tube with an external diameter of 2 mm, and the electron spin resonance spectrum was measured. This measurement was done under normal temperature, and the g value was determined by the comparison with the absorption curve of a manganese marker.

Figure 30:
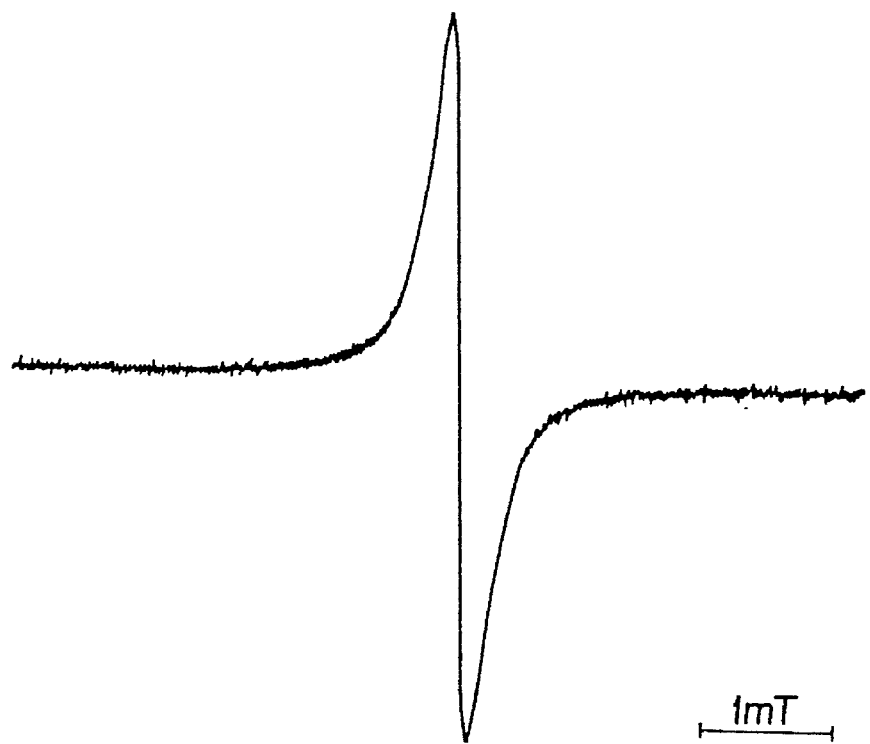
FIG. 30 is an electron spin resonance spectrum of the dispersion solution according to Example 15.

FIG. 30 shows an electron spin resonance spectrum which was obtained for a solution which was preserved for one hour at room temperature in a dark place.

Figure 31:
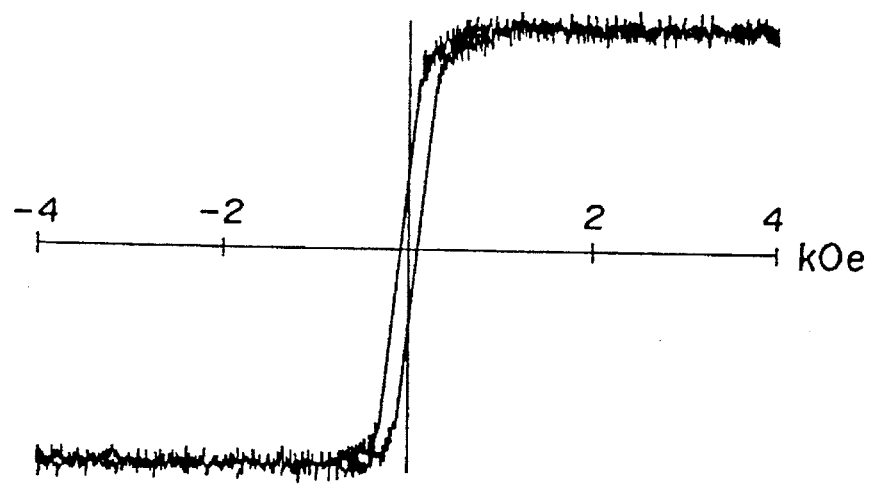
FIG. 31 is a magnetism hysteresis curve of the dried sample according to Example 15.

Also, when the hysteresis curve (M—H loop) of the strong magnetic substance obtained by drying the above mentioned dispersion solution was measured at room temperature using a vibratory sample magnetometer (VSM), the result shown in FIG. 31 was obtained as evidence of its ferromagnetism. The value of the saturation magnetic susceptibility σs of the sample was 0.0030 emu/g.

Comparison 1

Identical measurements were made in exactly the same manner as Example 1, for a system from which only the polystyrene was removed. The THF dispersion system of fluorinated carbon particles exhibited an electron spin resonance spectrum almost identical to that of the example. However, when this THS dispersion system without polystyrene was dried to obtain the solid residue, and the VSM was measured, no magnetism was observed, nor was any ferromagnetism discovered when measured at room temperature.

Comparison 2

Testing was done exactly as in Example 2, but using amorphous carbon with a d(002) surface space of 3.7 angstroms.

Amorphous carbon itself exhibits an extremely weak electron spin resonance spectrum, and its strength is less than 1/100 of that of $C_{60}F$, though both their weights were the same in the testing. This difference may be considered to be due to the structural asymmetry, or so-called "dangling site" radical structure of the amorphous carbon.

Nevertheless, even when polystyrene was added and dispersed as before, not only was there no increase at all in the paramagnetic absorption, but the absorption of the extremely weak amorphous carbon itself and others tended to decrease.

Comparison 3

Testing was done in the same manner as in Example 2, but using active carbon, and even when heat and ultraviolet radiation were applied, absolutely no paramagnetic absorption was observed.

As will be clear from the above explanation, the magnetic substance according to the present invention is a wholly novel magnetic substance composed of a carbonaceous material and a high molecular material, and is extremely light and highly workable compared to the conventional oxide or metallic magnetic substances.

In addition, the magnetic substance according to the present invention differs from organic magnetic substances which have been heretofore reported, in that it exhibits stable ferromagnetism even at room temperature.

Consequently, with its potential for application to many areas, such as magnetic powder in a magnetic recording medium, it offers an extremely valuable prospect for industrial use.

Also, according to the present invention, through the simple method of dispersing fine crystal spherical carbon into an organic polymer, it is possible to obtain the above mentioned novel magnetic substance at a high yield. Considering also that this novel magnetic substance can be produced in a stable supply, its potential for practical use is great.

What is claimed is:

1. A method for making a magnetic recording medium comprising the steps of:

providing a dispersion of an organic polymer, an unsubstituted fullerene having the formula $C_n$, wherein n is an integer selected from 60, 70, 76 and 84 and a halogen or hydrogen-introducing agent wherein said halogen or hydrogen-introducing agent is selected from the group consisting of hydrogen, chlorine, fluorine, bromine and iodine gas;

ultrasonically irradiating said dispersion in a sealed container; and maintaining the irradiated dispersion in said container until a magnetic recording medium comprising a matrix of a non-conductive material and a magnetized substituted fullerene having a ground state spin multiplicity in a doublet state is obtained.

2. A method as defined in claim 1, wherein said dispersion further comprises a polar organic solvent.

3. A method for making a magnetic recording medium comprising the steps of:

providing a dispersion of an organic polymer, an unsubstituted fullerene having the formula $C_n$, wherein n is an integer selected from 60, 70, 76 and 84 and a halogen or hydrogen-introducing agent wherein said halogen introducing agent is a halogen-containing salt;

ultrasonically irradiating said dispersion in a sealed container; and maintaining the irradiated dispersion in said container until a magnetic recording medium comprising a matrix of a non-conductive material and a magnetized substituted fullerene having a ground state spin multiplicity in a doublet state is obtained.

4. A method as defined in claim 3, wherein said dispersion further comprises a polar organic solvent.

\* \* \* \* \*